(12) United States Patent
York

(10) Patent No.: US 8,794,553 B2
(45) Date of Patent: Aug. 5, 2014

(54) CONTINUOUS MEAT GRINDING RECLAIMING SYSTEM

(76) Inventor: Jerry York, Manchester, IA (US)

( * ) Notice: Subject to any disclaimer, the term of this patent is extended or adjusted under 35 U.S.C. 154(b) by 21 days.

(21) Appl. No.: 13/467,681

(22) Filed: May 9, 2012

(65) Prior Publication Data

US 2012/0286077 A1 Nov. 15, 2012

Related U.S. Application Data

(60) Provisional application No. 61/518,906, filed on May 12, 2011.

(51) Int. Cl.
*B02C 17/02* (2006.01)

(52) U.S. Cl.
USPC ........................................ 241/24.26; 241/29

(58) Field of Classification Search
USPC .......... 241/29, 82.1, 82.2, 82.7, 24.16, 24.26, 241/78, 79; 452/135, 138; 99/537, 538
See application file for complete search history.

(56) References Cited

U.S. PATENT DOCUMENTS

| | | | |
|---|---|---|---|
| 3,298,057 A | | 1/1967 | Liebmann, Jr. |
| 3,739,994 A | * | 6/1973 | McFarland ...................... 241/74 |
| 3,743,192 A | | 7/1973 | Otto |
| 3,971,514 A | * | 7/1976 | Martinelli et al. ........... 241/82.4 |
| 4,004,742 A | | 1/1977 | Hess |
| 4,025,001 A | * | 5/1977 | Yarem et al. ............... 241/24.16 |
| 4,422,582 A | | 12/1983 | Roeger et al. |
| 4,536,920 A | * | 8/1985 | Amersfoort ................ 241/24.16 |
| 4,795,104 A | | 1/1989 | Rudibaugh |
| 7,114,671 B2 | | 10/2006 | David |
| 8,104,703 B2 | * | 1/2012 | Vila Bonas ................ 241/101.8 |

* cited by examiner

*Primary Examiner* — Faye Francis
(74) *Attorney, Agent, or Firm* — Knechtel, Demeur & Samlan

(57) ABSTRACT

An continuous meat grinding reclaiming system that provides a primary meat grinder unit and a secondary meat grinding unit for continuously and simultaneously processing a meat batch in a single processing run. The primary meat grinder unit is designed to grind a batch of meat by initially separating or extrapolating pure meat from the meat that contains bone; collecting the pure meat into a container; and transferring the meat that contains the bone to the secondary meat grinder unit. The secondary meat grinder unit is designed to further grind the batch of meat by separating additional pure meat from the meat that contains the bone; collecting this additional pure meat into the container with the original pure meat; and discard any remaining "undesireables". The meat grinding reclaiming system also provides an inventive variable valve reducer for controlling the flow of the undesireables through the secondary transfer pipe.

23 Claims, 11 Drawing Sheets

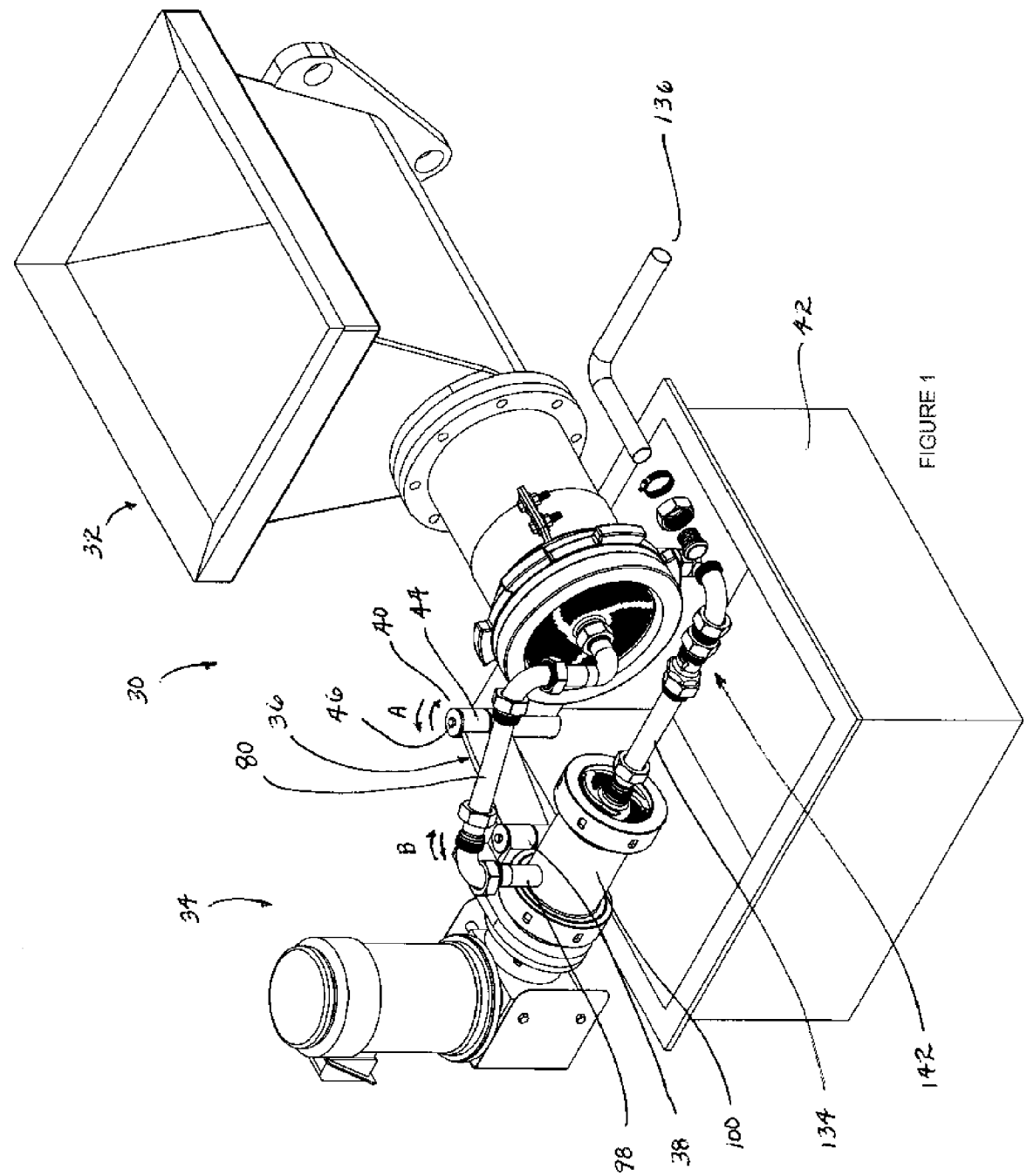

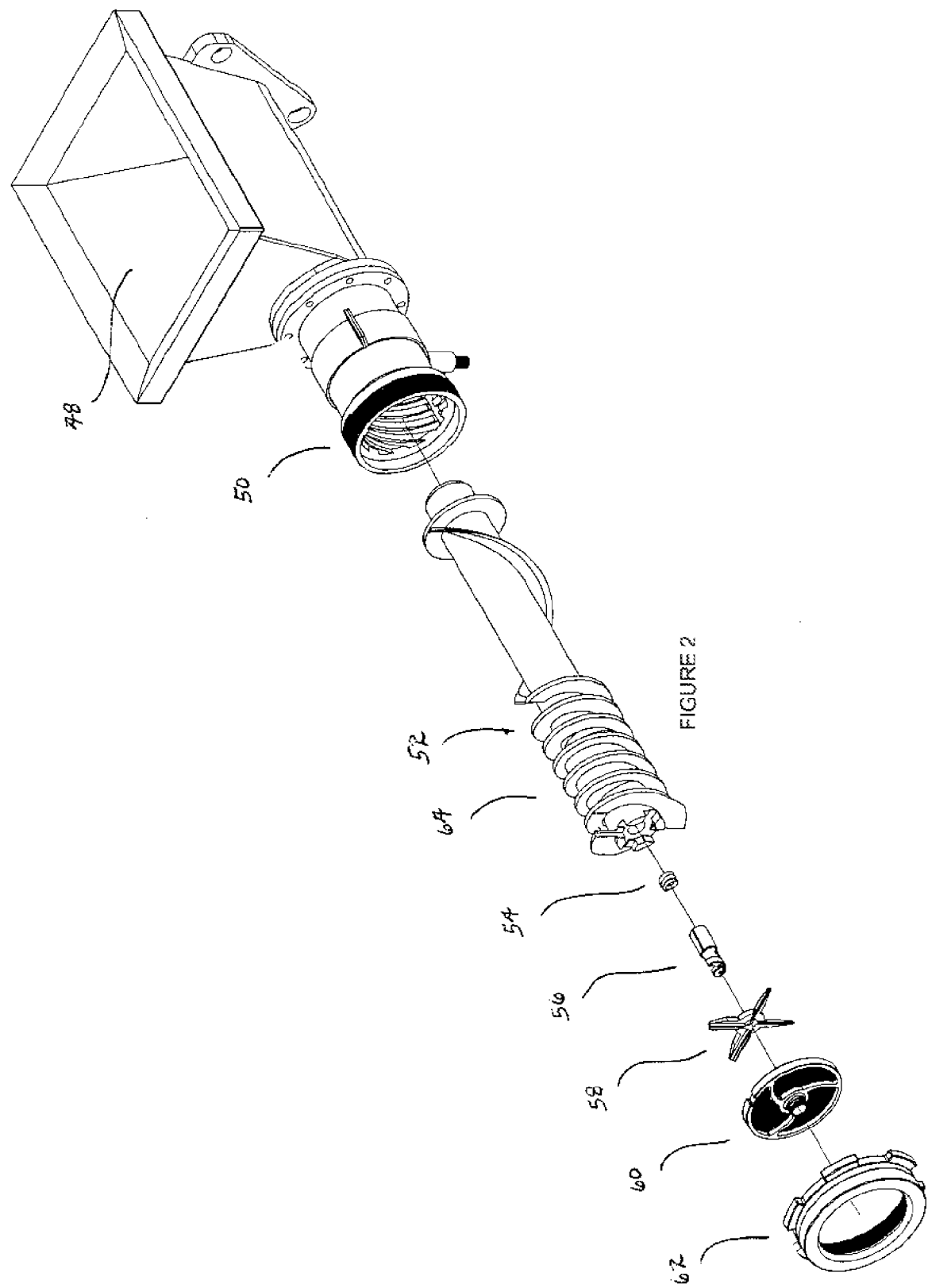

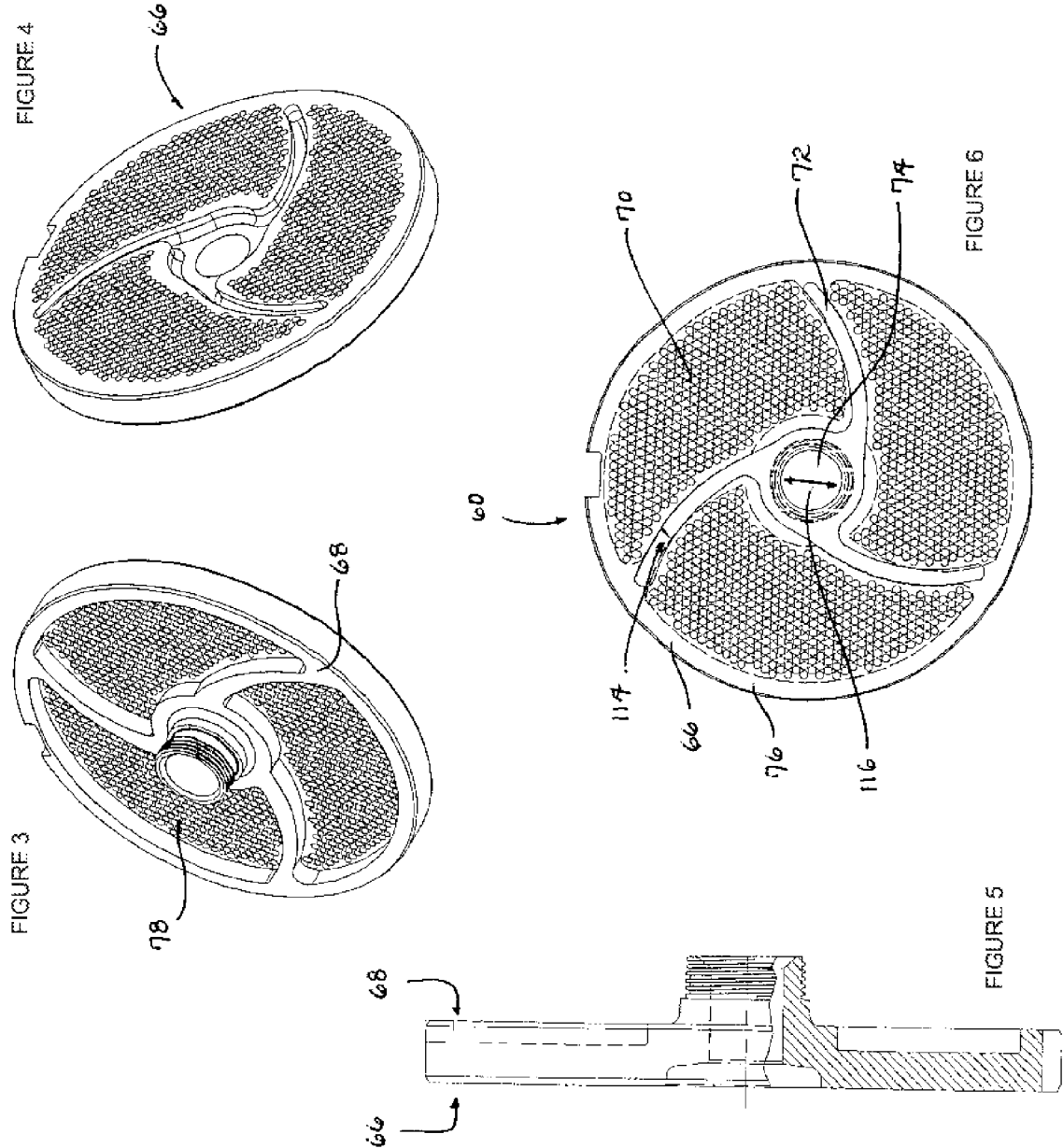

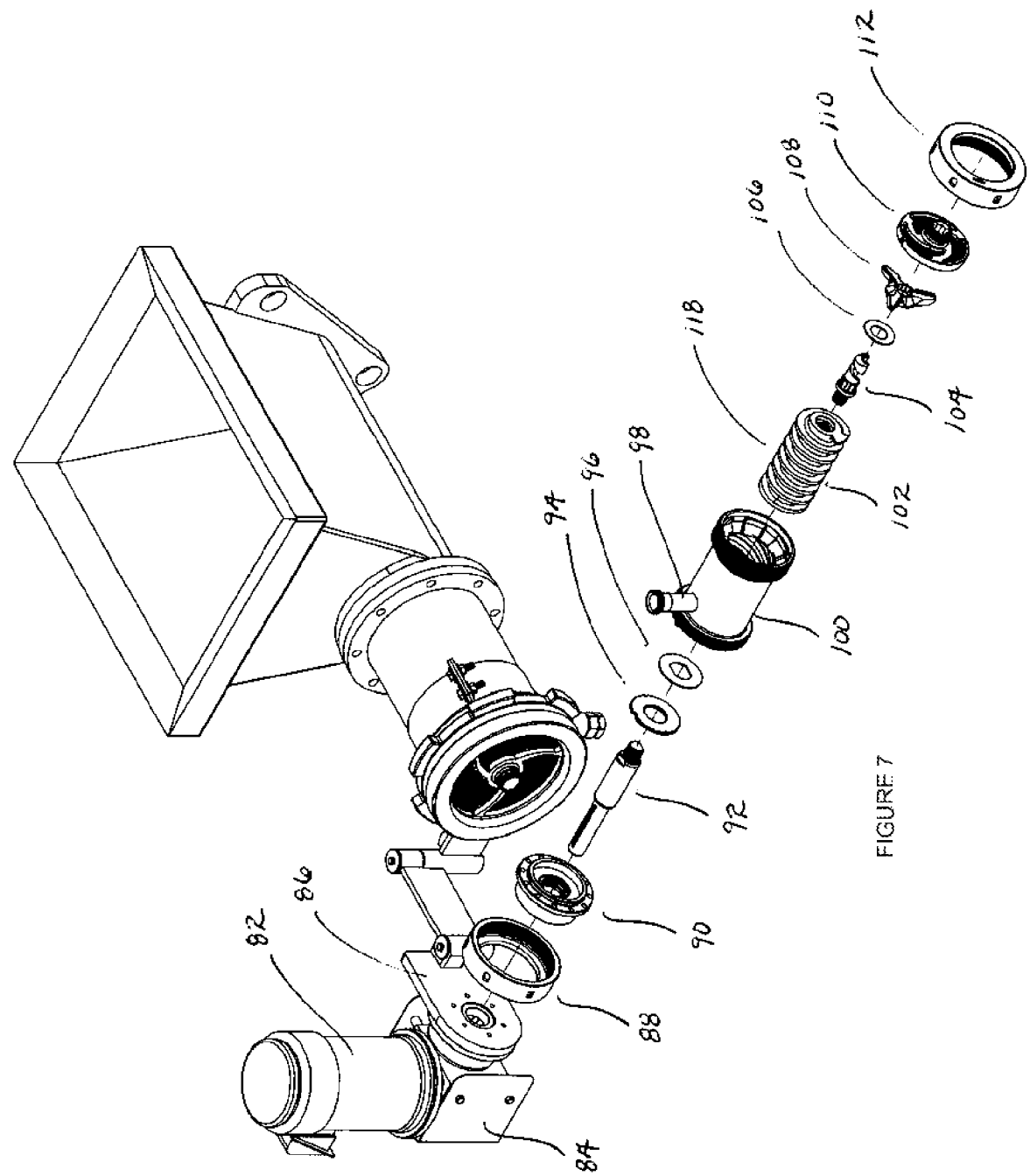

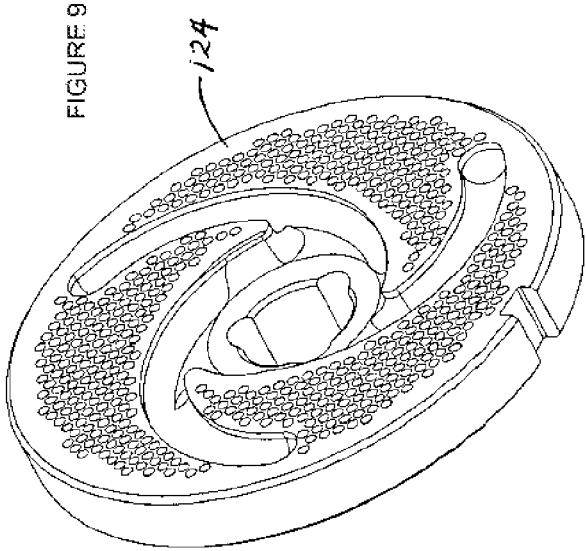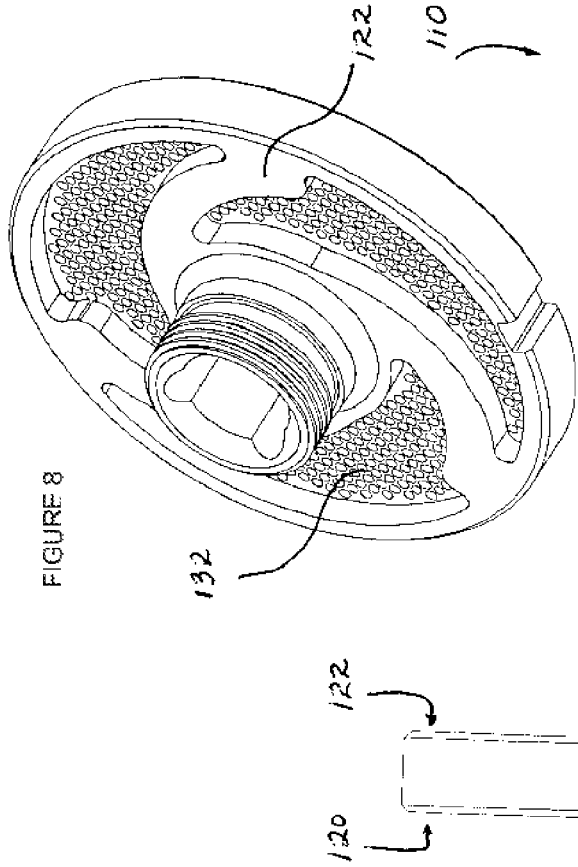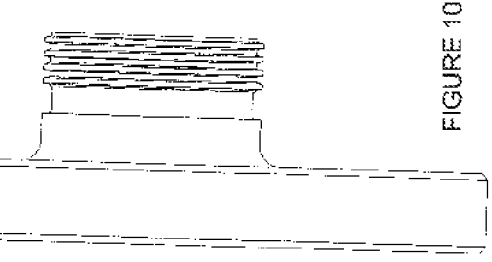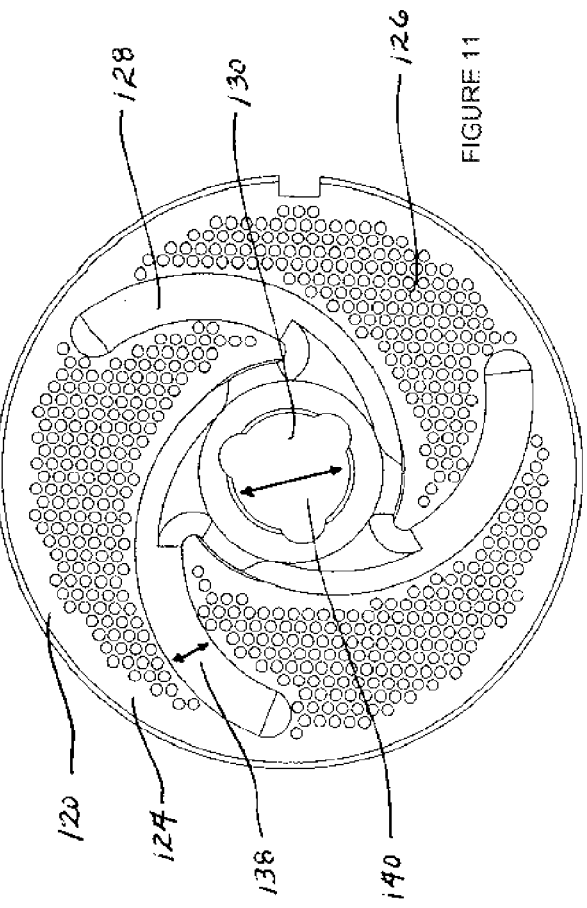

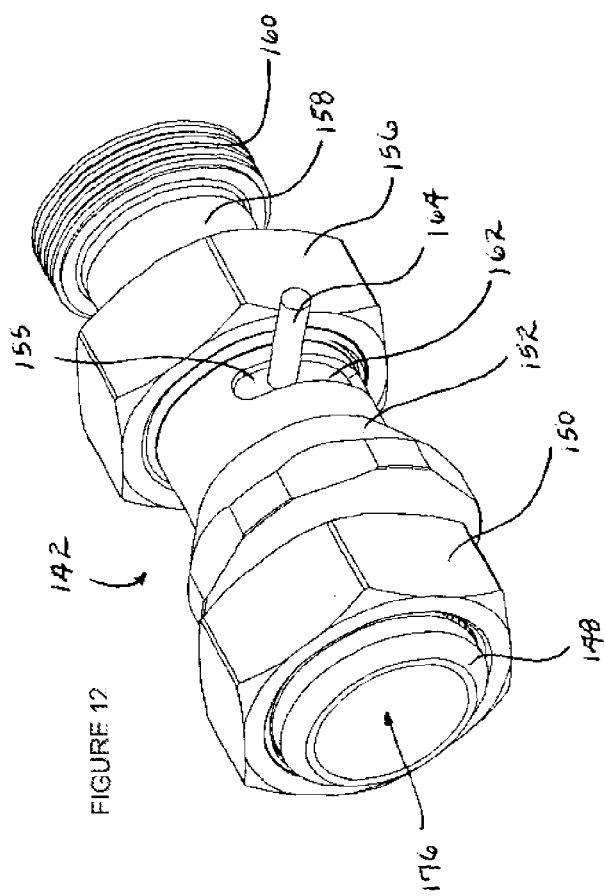

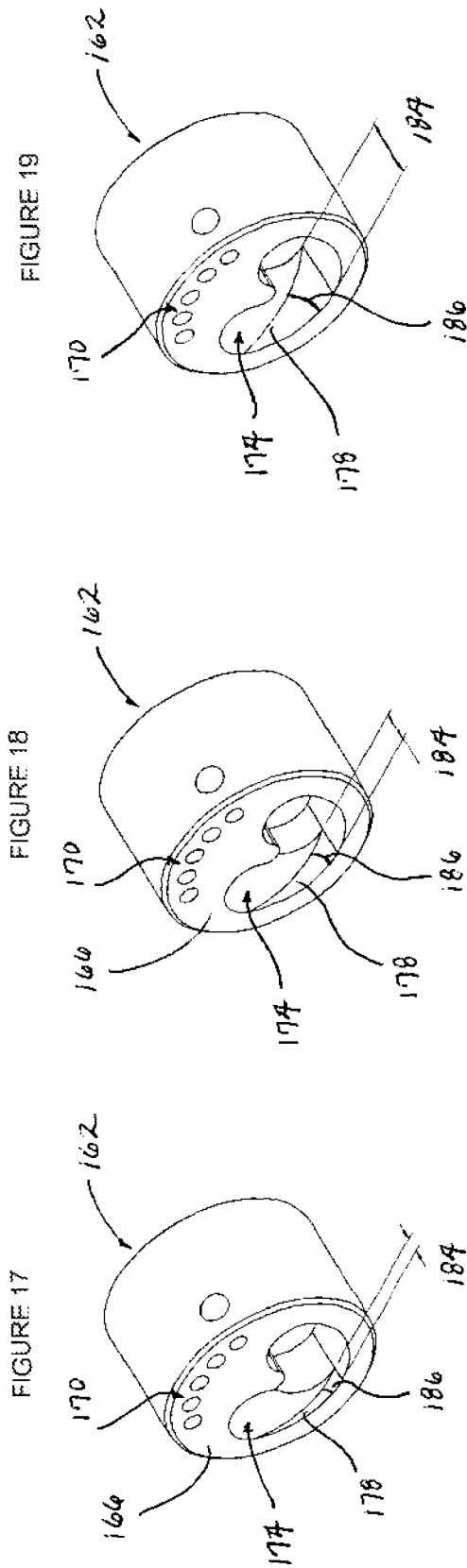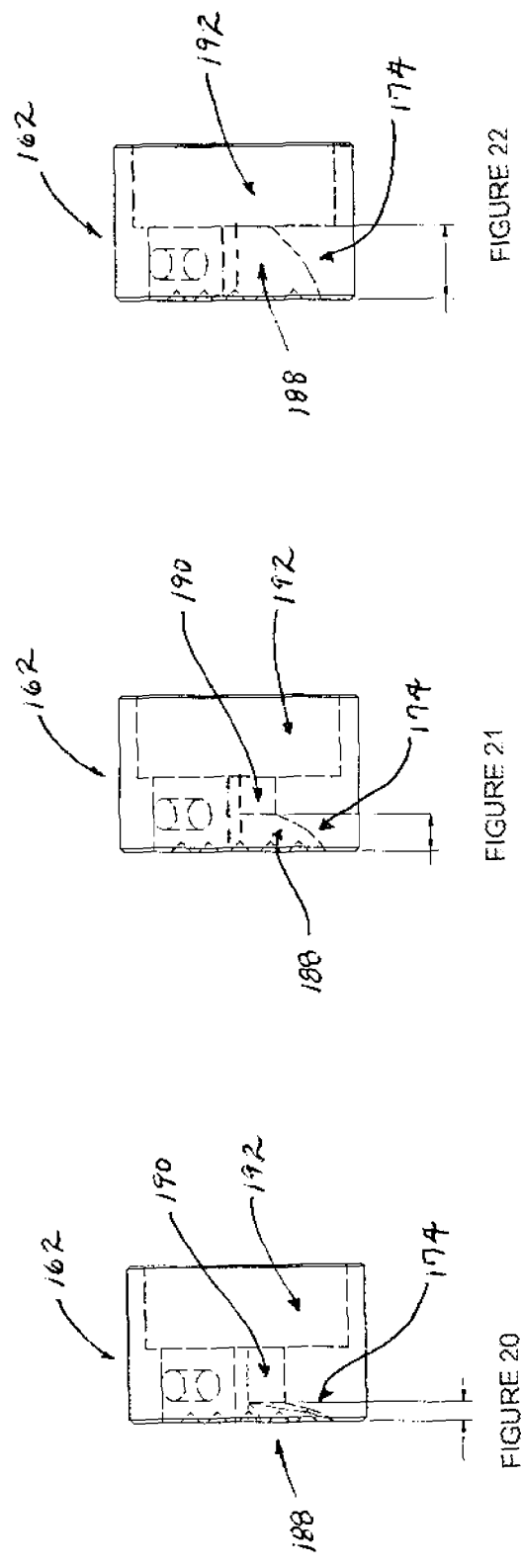

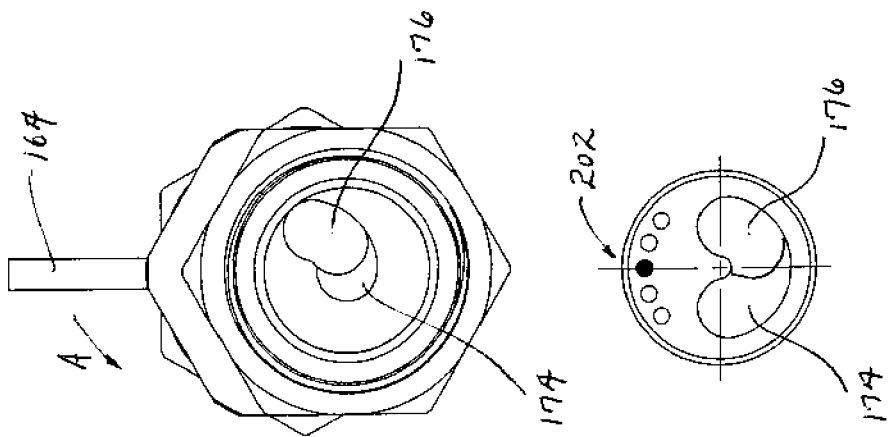
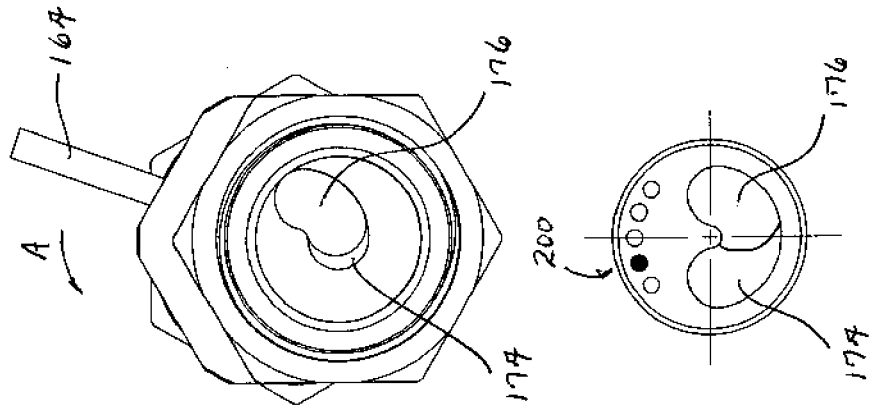
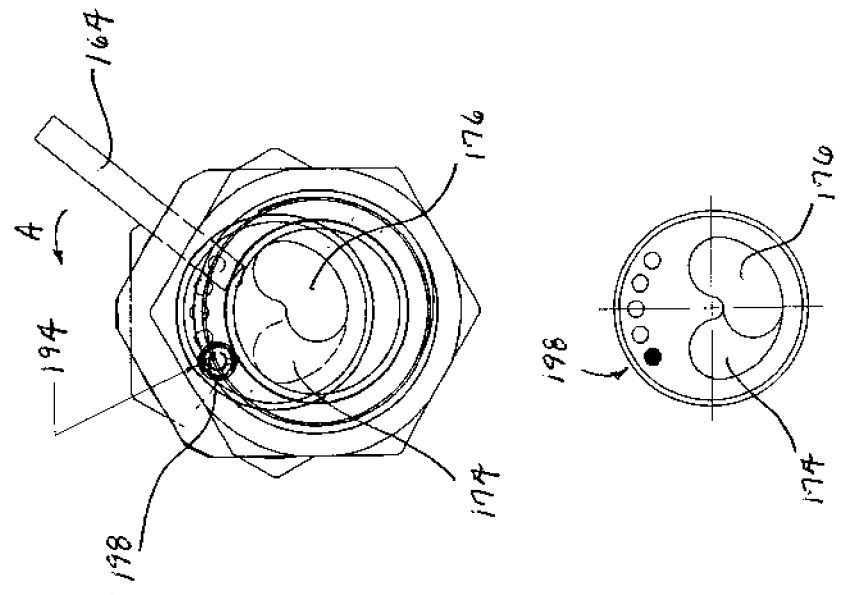

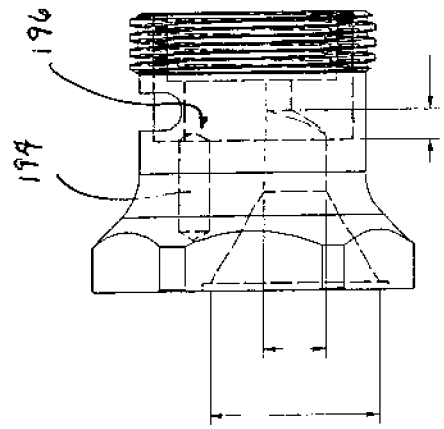
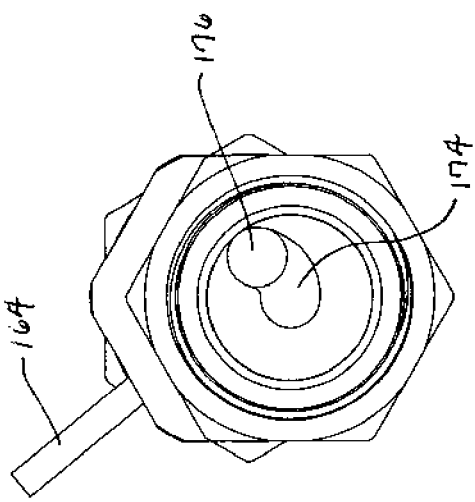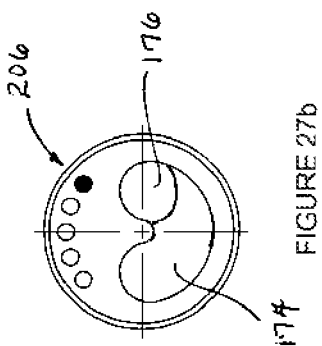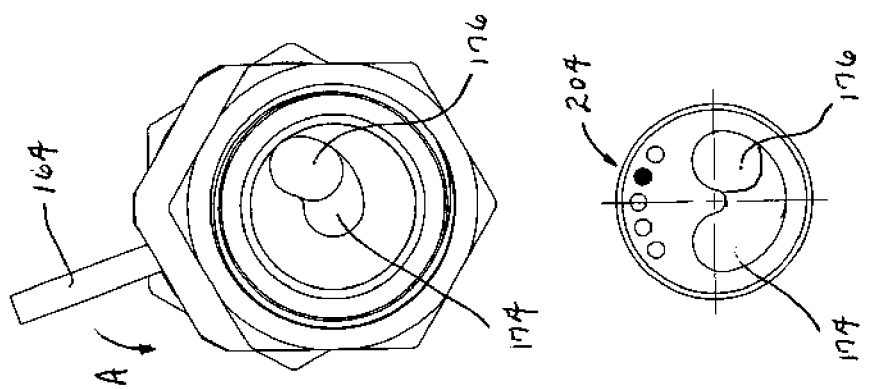

CONTINUOUS MEAT GRINDING RECLAIMING SYSTEM

I. CROSS-REFERENCE TO RELATED APPLICATION

This patent application is a non-provisional application claiming priority from U.S. Provisional Patent Application, Ser. No. 61/518,906, entitled "Continuous Meat Grinding Reclaiming System," filed on May 12, 2011, and is fully incorporated herein by reference.

II. FIELD OF THE INVENTION

The present invention relates to meat grinding systems and, more particularly, to an improved rotary meat grinding system that provides a primary meat grinder unit and a secondary meat grinder unit or reclaiming unit for continuously and simultaneously processing a meat batch in a single processing run. The meat grinding system also provides an inventive variable valve reducer for controlling the flow in the secondary transfer pipe.

III. DESCRIPTION OF THE PRIOR ART

In the meat grinding industry, there have been many meat grinder devices to extrapolate bone, hard gristle, foreign objects, etc. from the meat as it is being ground through the grinder. Such various meat grinding systems include but are not limited to those disclosed in the following patents U.S. Pat. No. 7,114,671 entitled "Device For Separating The Hard Components of A Grinder Used In The Field of The Food Industry, and In Particular For the Mincing of Meat"; U.S. Pat. No. 4,795,104 entitled "Multi-Station Meat Grinder with Bone Chip Removal Means"; U.S. Pat. No. 4,536,920 entitled "Two Stage Meat Strainer"; U.S. Pat. No. 4,422,582 entitled "Food Processing Machine"; U.S. Pat. No. 4,004,742 entitled "Rotary Meat Grinder with Bone-Collecting Facilities"; U.S. Pat. No. 3,971,514 entitled "Meat Grinder Attachment"; and U.S. Pat. No. 3,743,192 entitled "Comminutor-Mixer"; U.S. Pat. No. 3,298,057 entitled "Apparatus For Processing Meat." Although each of these patents disclose various means and apparatus for grinding and separating meat from bone, these patented devices do not solve a significant problem that currently exists in the industry.

During the grinding procedures for the preparation of meat for hamburger, sausage, etc. . . . , batches of meat are initially processed and separated into pure meat (i.e., that is meat not containing any bone) and rework meat (i.e., that is pure meat still containing bone and requiring further separation). This grinding process continues for many batches of meat from different lots or loads such that all of the pure meat from these various batches of meat and different lots or loads, upon initial processing, are grouped together and collected into a single container ("original batches of pure meat"). All of the remaining rework meat from each of these various batches of meat and different lots or loads are likewise grouped together and collected into another container ("batches of rework meat"). This collection of batches of rework meat is then stored in a refrigerated room, via a container or some other storage device, for later reprocessing by a rework grinder. The rework grinder then processes these collective batches of rework meat together for further separation. The pure meat from this rework grinder (i.e., that is pure meat that no longer contains any bone) is then mixed back into with the original batches of pure meat and the entire collection of all of this pure meat is later prepared for commercial packaging, etc. . . . while the remaining bone, etc. . . . from the rework grinder is discarded as waste.

Based on the above procedures, however, there are inherent problems in this processing system. For example: (a) the original batches of pure meat from the initial processing consists of many different batches of meat from different lots or loads which are grouped together and collected into a single container. Should it later be determined that any of the meat in this container is contaminated, it is nearly impossible to distinguish which of the different lots or batches of meat that the contamination came from and the entire container lot might have to be discarded;

(b) the batches of rework meat must be stored in a refrigerated room and maintained at a temperature at or below forty degrees Fahrenheit (40° F.). Should the temperature of the meat exceed this temperature, the rework meat could oxidize from exposure to the atmosphere before the rework meat reaches the refrigerator and/or bacterial growth or other contamination may occur to all or a portion of the batches of rework meat;

(c) the batches of rework meat should be reworked within four (4) hours and, even if reworked within that time frame, the same problems as discussed in (b) above may occur. Additionally, to accomplish this additional reworking at a later time, requires a further time delay and increased various labor and handling costs to accommodate same; and (d) the pure meat produced from the batches of rework meat is mixed back into the original batches of pure meat. Again, should it later be determined that any meat in this container is contaminated, it is nearly impossible to distinguish which of the different lots or batches of meat that the contamination came from and the entire container lot, containing all of the original batches of pure meat plus the pure meat from the batches of rework meat, might have to be discarded.

Applicant's inventive meat grinding reclaiming system, however, continuously and simultaneously processes a batch of meat in a single processing run solves these problems. Thus, there is a need and there has never been disclosed Applicant's new inventive continuous meat grinding reclaiming system.

IV. SUMMARY OF THE INVENTION

The present invention is a continuous meat grinding reclaiming system that comprises a primary meat grinder unit and a secondary (or reclaiming) meat grinding unit for continuously and simultaneously processing meat batches in a single processing run. The primary meat grinder unit is designed to grind meat by initially separating or extrapolating pure meat from the meat that contains bone, hard gristle, foreign objects, etc. . . . (collectively referred to herein as "bone"); collecting the pure meat into a container; and transferring the meat that contains the bone to the secondary meat grinder unit. The secondary meat grinder unit is designed to further grind the batch of meat (e.g., the exhausted meat) by separating additional pure meat from the meat that contains the bone; collecting this additional pure meat into the container with the original pure meat from the primary meat grinder unit; and discard any remaining meat containing bone (collectively referred to herein as "undesireables"). The meat grinding reclaiming system also provides an inventive variable valve reducer for controlling the flow of the undesireables through the secondary transfer pipe.

V. BRIEF DESCRIPTION OF THE DRAWINGS

The Description of the Preferred Embodiment will be better understood with reference to the following figures:

FIG. 1 is a perspective view of the meat grinding reclaiming system.

FIG. 2 is an exploded perspective view of the primary meat grinding unit.

FIG. 3 is a back side perspective view of the recessed plate used in the primary meat grinding unit.

FIG. 4 is a front side perspective view of the recessed plate used in the primary meat grinding unit.

FIG. 5 is a side view of the recessed plate used in the primary meat grinding unit.

FIG. 6 is a front view of the recessed plate used in the primary meat grinding unit.

FIG. 7 is an exploded perspective view of the secondary meat grinding unit.

FIG. 8 is a back side perspective view of the recessed plate used in the secondary meat grinding unit.

FIG. 9 is a front side perspective view of the recessed plate used in the secondary meat grinding unit.

FIG. 10 is a side view of the recessed plate used in the secondary meat grinding unit.

FIG. 11 is a front view of the recessed plate used in the secondary meat grinding unit.

FIG. 12 is a perspective view of a variable valve reducer.

FIG. 13 is a side view of the variable valve reducer.

FIG. 14 is a front view of the variable valve reducer.

FIG. 15 is a cross-sectional view, taken along line 15-15 of FIG. 13, of the variable valve reducer.

FIG. 17 is a side perspective view of the valve regulator insert and, in particular, illustrating the positioning of the curved wall.

FIG. 18 is a side perspective view of the valve regulator insert and, in particular, illustrating an alternate positioning of the curved wall.

FIG. 19 is a side perspective view of the valve regulator insert and, in particular, illustrating another alternate positioning of the curved wall.

FIG. 20 is a bottom view of the valve regulator insert as illustrated in FIG. 17.

FIG. 21 is a bottom view of the valve regulator insert as illustrated in FIG. 18.

FIG. 22 is a bottom view of the valve regulator insert as illustrated in FIG. 19.

FIG. 23a is a front view of the valve regulator insert and, in particular, illustrating the curved wall in the fully open position.

FIG. 23b is a front view of the valve regulator insert and, in particular, illustrating the detent used to position the curved wall in the fully open position.

FIG. 24a is a front view of the valve regulator insert and, in particular, illustrating the curved wall in a second position.

FIG. 24b is a front view of the valve regulator insert and, in particular, illustrating the detent used to position the curved wall in the second position.

FIG. 25a is a front view of the valve regulator insert and, in particular, illustrating the curved wall in a third position.

FIG. 25b is a front view of the valve regulator insert and, in particular, illustrating the detent used to position the curved wall in the third position.

FIG. 26a is a front view of the valve regulator insert and, in particular, illustrating the curved wall in a fourth position.

FIG. 26b is a front view of the valve regulator insert and, in particular, illustrating the detent used to position the curved wall in the fourth position.

FIG. 27a is a front view of the valve regulator insert and, in particular, illustrating the curved wall in a fifth position.

FIG. 27b is a front view of the valve regulator insert and, in particular, illustrating the detent used to position the curved wall in the fifth position.

FIG. 28 is a side view of the valve regulator insert and, in particular, illustrating the plunger and protruding tip inserted into the detent to secure or lock the curved wall into position within the passageway of the variable valve reducer.

VI. DETAILED DESCRIPTION OF THE PREFERRED EMBODIMENT

Figure 16:
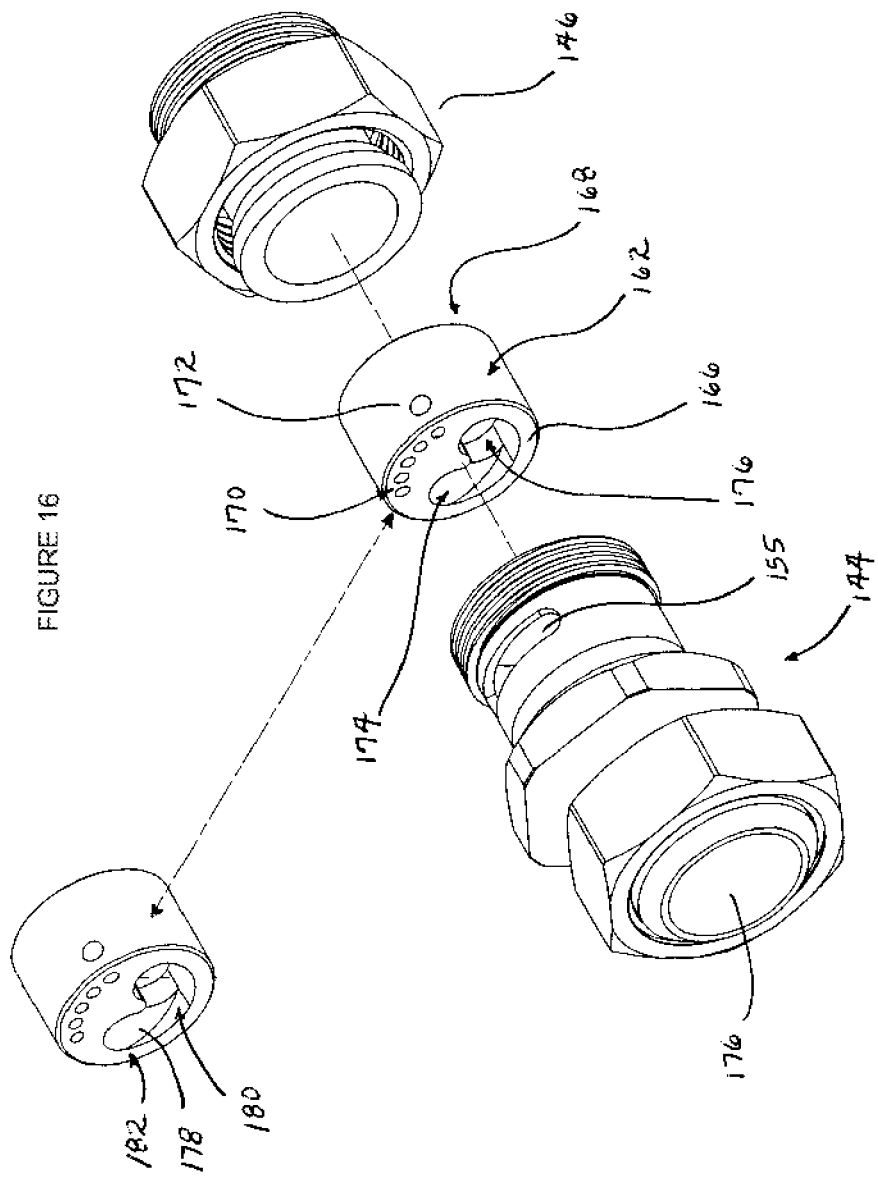
FIG. 16 is an exploded perspective view of the variable valve reducer and, in particular, illustrating the valve body, the valve regulator insert, and the end coupling.

Turning first to FIG. 1, there is illustrated a continuous meat grinding reclaiming system 30 separated into a primary meat grinding unit 32 and a secondary (or reclaiming) meat grinding unit 34.

The primary meat grinding unit 32, and its components, are more clearly shown in the exploded view as illustrated in FIG. 2. As illustrated, the primary meat grinding unit 32 comprises a hopper 48, a spiral barrel 50, an auger 52, a stud spring 54, a knife drive 56, a knife blade 58, a recessed plate 60, and a coupling ring 62, which when fixedly attached to the spiral barrel 50, secures these components therein. The primary meat grinding unit 32 is also electrically powered by an electric motor or any other power means that is known by one skilled in the art. In the preferred embodiment, the motor is preferably a single speed motor. Alternatively, the motor may be another other type of motor provided that it has sufficient power to run the primary meat grinding unit 32 as described in further detail below and accomplish the purposes described herein.

In use, the primary meat grinding unit 32 is designed to grind a block of meat deposited into the hopper 48 and, more specifically, begin the separation or extrapolation of bone, hard gristle, foreign objects, etc. . . . from the meat. A typical block of meat may weigh upwards of approximately two thousand pounds (2000 lbs.). Alternatively, the size and amount of meat may vary, if desired. Upon depositing the block of meat into the hopper 48, the block of meat engages the auger 52 within the hopper 48 which, when powered, is continuously rotating. As the auger 52 is rotating, a helical screw blade 64 acts as a screw conveyor to advance the meat through the spiral barrel 50. Should the block of meat be initially too large to be advanced through the spiral barrel 50, the helical screw blade 64, during rotation, will continually cut the block of meat into smaller blocks or sections until these meat blocks or sections are of sufficient size to be advanced by the auger 52 through the spiral barrel 50. As the auger 52 continues to rotate, the meat will be continually advanced by the helical screw blade 64 toward the knife blade 58, rotatably driven by the knife drive 56, and the recessed plate 60. When the meat reaches the knife blade 58 and recessed plate 60, the pressure exerted by the rotating auger 52 will force the meat against the recessed plate 60 positioning the meat to be cut by the knife blade 58.

The recessed plate 60 is more clearly illustrated in FIGS. 3-6. As illustrated, the recessed plate 60 has a front side 66 and a back side 68. The front side 66 is substantially a flat surface 76 having a plurality of holes 70 and a plurality of recessed grooves 72 each leading or funneling into a central opening 74. In the preferred embodiment, each of the plurality of holes 70 are substantially the same size and each of the plurality of recessed grooves 72 are substantially identical to one another.

As the meat is forced against the recessed plate 60, the rotating knife blade 58 will abrade, slice, shear, grind, ground, or otherwise cut (collectively referred to herein as "cut") the meat into smaller pieces of meat which, when cut into small enough pieces, the meat not containing any bone will be forced through one of the plurality of holes 70. The portions of the meat containing the bone, bone fragments, hard gristle, foreign objects, etc. . . . (collectively referred to herein as "bone"), however, are too large to pass through the plurality of holes 70. These portions of the meat and the bone will be swept around the flat surface 76 of the recessed plate 60 and will continually be cut into smaller pieces of meat by the knife blade 58 until this additional meat is cut into small enough pieces to pass through one of the plurality of holes 70. For the portions of the meat containing the bone that is still too large to pass through the plurality of holes 70, this meat and bone will rotate across the flat surface 76 and cut down until it engages one of the plurality of grooves 72. Due to the additional or new meat that is subsequently being advanced by the auger 52 toward the recessed plate 60, the pressure of this new advancing meat against this earlier meat and bone will force this meat containing bone into one of the plurality of grooves 72 where it becomes captured and no longer able to be swept around the flat surface 76 of the recessed plate 60. Then, as the plurality of grooves 72 become filled, the rotary motion of the knife blade 58 will exert a camming action on the meat containing bone within each of the plurality of grooves 72 tending to move this meat containing bone along the plurality of grooves 72 toward, and ultimately into, the central opening 74. In this manner, the meat not containing any bone (collectively referred to herein as "pure meat") that is ground to a sufficient size to pass through the plurality of holes 70 of the recessed plate 60 and exit out one of the plurality of outlets 78 situated in the back side 68 of the recessed plate 60 is released or dropped into and collected in the container 42 (see FIG. 1). The meat containing the bone that is captured into each of the plurality of grooves 72 and, which is funneled into the central opening 74, is then forced through the central opening 74 and into a transfer pipe 80 (see FIG. 1). In the preferred embodiment, the plurality of grooves 72 have a thickness or width 114 that is smaller than the diameter 116 of the central opening 74. In this manner, any meat containing the bone that is cut down or of sufficient size for accommodating into the central opening 74 is subsequently transferred through to the transfer pipe 80. The meat containing the bone is then transported through the transfer pipe 80 and into the secondary meat grinding unit 34.

The secondary meat grinding unit 34, and its components, are more clearly shown in the exploded view as illustrated in FIG. 7. As illustrated, the secondary meat grinding unit 34 comprises a motor 82, a motor guard 84, a plate 86, a coupling nut 88, a housing adapter 90, a drive shaft 92, a hardened thrust plate 94, a composite bearing 96, an inlet tube 98, a spiral barrel 100, an auger 102, a knife drive 104, a knife spring 106, a knife blade 108, a recessed plate 110, and an end ring 112.

In use, the secondary meat grinding unit 34 is designed to grind and/or extrapolate further bone, hard gristle, foreign objects, etc. . . . from the meat transferred from the primary meat grinding unit 32. As previously disclosed, meat containing bone discarded from the primary meat grinding unit 32 is funneled into the transfer pipe 80. This meat containing the bone is then transferred through the transfer pipe 80 and into the inlet tube 98 of the secondary meat grinding unit 34 (see also FIG. 1) where it is received into the spiral barrel 100 of the secondary meat grinding unit 34. Upon the meat containing the bone being received into the spiral barrel 100, this meat containing bone engages the auger 102 which, when powered, is continuously rotating. As the auger 102 is rotating, a helical screw blade 118 acts as a screw conveyor to advance the meat through the spiral barrel 100 toward the knife blade 108, rotatably driven by the knife drive 104, and the recessed plate 110. When the meat containing bone reaches the knife blade 108 and recessed plate 110, the pressure exerted by the rotating auger 102 will force the meat containing bone against the recessed plate 110 positioning the meat to be cut by the knife blade 108.

The recessed plate 110 is more clearly illustrated in FIGS. 8-11. As illustrated, the recessed plate 110 has a front side 120 and a back side 122. The front side 120 is substantially a flat surface 124 having a plurality of holes 126 and a plurality of recessed grooves 128 each leading or funneling into a central opening 130. In the preferred embodiment, each of the plurality of holes 126 are substantially the same size and each of the plurality of recessed grooves 128 are substantially identical to one another.

the meat containing the bone is forced against the recessed plate 110, the rotating knife blade 108 will further abrade, slice, shear, grind, ground, or otherwise cut (collectively referred to herein as "cut") the meat containing bone into even smaller pieces of meat which, when cut into small enough pieces, the meat not containing any bone will be forced through one of the plurality of holes 126. The remaining portions of the meat containing the bone, bone fragments, hard gristle, foreign objects, etc. . . . (collectively referred to herein as "bone"), however, that remain will be too large to pass through the plurality of holes 126. These portions of the remaining meat and the bone will be swept around the flat surface 124 of the recessed plate 110 and will continually be cut into smaller pieces of meat by the knife blade 108 until additional meat is cut into small enough pieces to pass through one of the plurality of holes 126. For the portions of the meat still containing bone that is still too large to pass through the plurality of holes 126, this meat containing bone will rotate across the flat surface 124 and be cut down until it engages one of the plurality of grooves 128. Due to the meat that is subsequently being advanced by the auger 102 toward the recessed plate 110, the pressure of this advancing meat against this meat containing bone will force this remaining meat containing bone into one of the plurality of grooves 128 where it becomes captured and no longer able to be swept around the flat surface 124 of the recessed plate 110. Then, as the plurality of grooves 128 become filled, the rotary motion of the knife blade 108 will exert a camming action on this remaining meat containing bone (e.g., typically a much higher content of bone than meat at this point) within each of the plurality of grooves 128 tending to move this remaining meat containing bone along the plurality of grooves 128 toward, and ultimately into, the central opening 130. In this manner, the additional meat not containing any bone (collectively referred to herein as "additional pure meat") that is ground to a sufficient size to pass through the plurality of holes 126 of the recessed plate 110 and exit out one of the plurality of outlets 132 situated in the back side 122 of the recessed plate 110. This additional pure meat is likewise released or dropped into and collected in the container 42 along with the "pure meat" from the primary meat grinding unit 32. The meat containing the bone that is captured into each of the plurality of grooves 128 and, which is funneled into the central opening 130, is then forced through the central opening 130 and into a secondary transfer pipe 134 (see FIG. 1). In the preferred embodiment, the plurality of grooves 128 have a thickness or width 138 that is smaller than the diameter 140 of the central opening 130. In this manner, any remaining meat containing bone that is cut down or of sufficient size for accommodating into the central opening 130 is subsequently transferred through to the secondary transfer pipe 134. This remaining meat containing the bone (collectively referred to herein as "undesireables") is then transported through the secondary transfer pipe 134 until it is forced out the exit portal 136, collected and discarded.

The primary meat grinding unit 32 is attached to the secondary meat grinding unit 34 by a rotating arm 36. The rotating arm 36 comprises a vertical hinge means 38 and 40. The vertical hinge means 38 and 40 comprises a tube 44 having a bearing providing a receiving chamber (not illustrated) and a shaft 46. The tube 44 is illustrated as being cylindrical in shape, however, the tube 44 may alternatively be any other shape as desired provided that the tube 44 accomplishes the invention as disclosed. To create the vertical hinge means 38 and 40, the shaft 46 is inserted into the receiving chamber of the bearing and retained by the tube 44. In the preferred embodiment, the shaft 46 is then freely rotatable within the tube 44 by the bearings. Alternatively, the vertical hinge means 38 and 40 can be any other or type of hinge means that is known by one skilled in the art.

In use, the vertical hinge means 40 permits the secondary meat grinding unit 34 to rotate or pivot about a first axis of rotation A and the vertical hinge means 38 permits the secondary meant grinding unit 34 to also rotate or pivot about a second axis of rotation B. In the preferred embodiment, the first axis of rotation A and the second axis of rotation B permit rotation in both the clockwise and counter clockwise direction. In this manner, the combination of the vertical hinge means 38 and 40 enables the secondary meat grinding unit 34 to be properly positioned relative to the primary meat grinding unit 32 for use of both the primary meat grinding unit 32 and secondary meat grinding unit 34 (and as discussed in more detail herein) and to facilitate collection of all of the pure meat from a block of meat into the same container 42.

During this process of separating or extrapolating bone, hard gristle, foreign objects, etc. . . . from a batch of meat, in the preferred embodiment, the plurality of holes 126 in the recessed plate 110 of the secondary meat grinding unit 34 (see FIGS. 8-11) are the exact same or substantially the same size than the plurality of holes 70 in the recessed plate 60 of the primary meat grinding unit 32 (see FIGS. 3-6). In this manner, the pure meat processed from the primary meat grinding unit 32 and the additional pure meat processed from the secondary grinding unit 34 will be the exact same or substantially the same size for commercial use. Additionally, the plurality of grooves 128 in the recessed plate 110 of the secondary meat grinding unit 34 (see FIGS. 8-11) have a width 138 that is larger than the width 114 of the plurality of grooves 72 in the recessed plate 60 of the primary meat grinding unit 32 (see FIGS. 3-6). In this manner, the recessed plate 60 in the primary meat grinding unit 32, through the plurality of holes 70 and plurality of grooves 72, produces "pure meat" from the batch of meat deposited into the hopper 58 while excluding and cutting down the meat containing the bone into smaller pieces. Likewise, even after the batch of meat has been reduced in size by the primary meat grinding unit 32, the recessed plate 110 in the secondary meat grinding unit 32, through the smaller plurality of holes 126 and smaller plurality of grooves 128, continues to produce "additional pure meat" from the meat containing the bone that is transferred from the primary meat grinding unit 32 while continuing to exclude the meat containing the bone. As the "pure meat" and "additional pure meat" are being processed, the remaining meat containing bone (i.e., the "undesireables") remains within the secondary meat grinding unit 34. As such, the width 138 of the plurality of grooves 128 in the recessed plate 110 of the secondary meat grinding unit 34 is larger than the width 114 of the plurality of grooves 72 in the recessed plate 60 of the primary meat grinding unit 32 to capture these undesireables.

Also, during the processing of the meat within the secondary meat grinding unit 34, the motor 82 used is preferably a variable speed control motor. Alternatively, the motor 82 may be another other type of motor provided that it has sufficient power to run the secondary meat grinding unit 34 and accomplish the purposes described herein. In the preferred embodiment, the motor 82 is set at an initial desired speed to control the production rates (i.e., for the auger 102 to advance the meat through the spiral barrel 100 such that the consistency of meat is being processed through the recessed plate 110 and the temperature of the meat is controlled and/or remains at a processing temperature). In the preferred embodiment, the processing temperature of the meat should remain at or below approximately forty degrees Fahrenheit (40° F.).

During processing, however, the speed of the motor 82 (and therefore production rate) might need to be altered or changed if the consistency of the meat and/or the temperature of the meat changes. For example, if the additional pure meat processed from the secondary meat grinding unit 34 begins to lose its consistency, such as appearing crushed or mashed, this would indicate that the speed of the motor 82 is too fast causing the auger 102 to process or force the meat through the recessed plate 110 too fast. If this occurs, the speed of the motor 82 would then need to be reduced to slow down the production rate and thereby maintain the consistency of the meat being processed.

If, however, the additional pure meat processed from the secondary meat grinding unit 34 appears to possibly contain some bone particles, this would indicate that the speed of the motor 82 is too slow causing the auger 102 to process or force the meat, and including some bone, through the plurality of holes 126 in the recessed plate 110. If this occurs, the speed of the motor 82 would then need to be increased to increase the production rate and thereby prevent any bone from being passed through the plurality of holes 126 in the recessed plate; and instead, allow for proper separation of the additional pure meat from the undesireables.

Additionally, if the processing of the meat through the secondary meat grinding unit 34 begins to increase the temperature of the meat above approximately forty degrees Fahrenheit (40° F.), this temperature would be too hot and thereby potentially cause the meat to begin cooking which could potentially cause a commercial devaluation of the meat. To prevent the temperature from causing this undesired affect and possibly cooking the meat, the speed of the motor 82 would then need to be reduced to slow down the production rate and thereby maintain the temperature of the meat at or below approximately forty degrees Fahrenheit (40° F.).

Accordingly, depending upon the conditions of the batch of meat being processed (e.g., frozen batch of meat versus warm batch of meat) and the desired results of the processing, the speed of the motor 82 can be adjusted to produce a slower or faster processing rate, as desired. In this manner, the temperature of the meat being processed can be controlled such that it remains substantially at the processing temperature and the consistency of meat being processed through the secondary meat grinding system 34 can be maintained, as desired.

Additionally, Applicant's continuous meat claiming reclaiming system controls the pressure within the system. Specifically, the batch of meat and bone processed through the primary meat grinding unit 32 is transferred into a transfer pipe 80 (see FIG. 1) that is preferably one and one-half inches (1½") in diameter which helps release pressure. As the meat and bone enter into the secondary meat grinding unit 34, the spiral barrel 100 expands to four and one-half inches (4½") in diameter. As the meat and bone proceed through the spiral barrel 100, the spiral barrel 100 further expands to six and one-quarter (6¼") in diameter before the meat and bone engage the recessed plate 110, thereby releasing more pressure. In this manner, the system relieves the pressure on the meat being processed resulting in a separation of the meat from the bone, not caused by pressure within the system but by the process itself and thereby separating the bone without crushing it, and further enables the pure meat and additional pure meat to be substantially identical product in temperature (without raising) in the same working batch.

With respect to the remaining meat containing the bone (collectively referred to herein as "undesireables"), a variable valve reducer 142 (see FIG. 1) is also used for controlling the flow of the undesireables within the secondary transfer pipe 134 and thereby assist in: (a) creating back pressure on the recessed plate 110; and in (b) transporting and forcing these undesireables through the secondary transfer pipe 134 to reach the exit portal 136 such that these undesireables may be subsequently collected and discarded.

The variable valve reducer 142 is more clearly illustrated in FIGS. 12-15. As illustrated, the variable valve reducer 142 comprises a valve body 144 and an end coupling 146. The valve body 144 comprises a bevel ferrule 148, a hex nut 150, a hollow tube 152 having an external threaded end 154, and a sleeve 155. The end coupling 146 comprises a hex nut 156 having an internal thread, a coupling body 158, and a threaded ferrule 160. Upon screwing the external threaded end 154 of the hollow tube 152 into the internal thread of the hex nut 156, the valve body 144 is releaseably attached to the end coupling 146. The bevel ferrule 148 of the valve body 144 and the threaded ferrule 160 of the end coupling 146 are used to fixedly secure the respective ends of the variable valve reducer 142 within the secondary transfer pipe 134 (see FIG. 1).

Situated and releaseably secured within the valve body 144 and end coupling 146 is a valve regulator insert 162 having as a controlling means a lever 164. The valve regulator insert 162 is more clearly illustrated in FIG. 16. As illustrated, the valve regulator insert 162 comprises a front surface 166 and a back surface 168. Located on the front surface 166 is a plurality of detents 170. A lever recessed hole 172 is also situated on the exterior of valve regulator insert 162 and has a sufficient size to releaseably retain the lever 164 when in use. Situated within the valve regulator insert 162 is an curved wall 174. This curved wall 174 leads or extends into a passageway 176 that extends through the entire variable valve reducer 142 which includes through the front surface 166 and out the back surface 168 of the valve regulator insert 162.

In the preferred embodiment, the curved wall 174 has a curved shape. In the preferred embodiment, this curved shape could helical, curvilinear, coiling, corkscrew, spiral, involute, screwlike, winding, and/or any other curved shape that is known to one skilled in the art. The curved wall 174 has a proximal end 180 positioned at a location relative to the passageway 176 and a distal end 182 adjacent to the front surface 166 of the valve regulator insert 162. In the preferred embodiment, the proximal end 180 of the curved wall 174 is positioned at a depth 184 (see FIG. 18). In the preferred embodiment, the depth 184 is substantially 0.250 inches. Alternatively, the depth 184 may be increased or decreased to accommodate the proper flow or production rate through the valve regulator insert 162, as desired. As illustrated in FIG. 17, the depth 184 is substantially 0.125 inches, or, in another alternative embodiment, as illustrated in FIG. 19, the depth 184 may be substantially 0.500 inches. Depending upon the depth 184 that is used and placement of the proximal end 180 relative to the passageway 176 will determine the impact that the curved wall 174 has with respect to the flow of the undesireables through the variable valve reducer 142 and ultimately within the secondary transfer pipe 134.

For example, if the depth 184 of the proximal end 180 is at 0.125 inches, as illustrated in FIGS. 17 and 20, the curved wall 174 is situated in a constricting plane 178. In this manner, this constricting plane 178 is positioned at an angle 186 to the front surface 166 of the valve regulator insert 162. If the depth 184 of the proximal end 180 is at 0.250 inches, as illustrated in FIGS. 18 and 21, the curved wall 174 is situated in the constricting plane 178 at a larger angle 186 to the front surface 166 of the valve regulator insert 162. Alternatively, if the depth 184 of the proximal end 180 is at 0.500, as illustrated in FIGS. 19 and 22, the curved wall 174 is situated in the constricting plane 178 at a further larger angle 186 to the front surface 166 of the valve regulator insert 162. In this manner, the smaller the depth 184 and location of the proximal end 180, the smaller the angle 186 that the constricting plane 178 is in relation to the front surface 166 of the valve regulator insert 162. Likewise, the larger the depth 184 and location of the proximal end 180, the larger the angle 186 that the constricting plane 178 is in relation to the front surface 166 of the valve regulator insert 162. Thus, when in use, the smaller depth 184 and smaller angle 186 permits the curved wall 174 to have a greater impact on restricting the flow through the valve regulator insert 162 when the curved wall 174 is rotated along the constricting plane 178 and positioned or extended into the passageway 176.

This is also exemplified or more clearly illustrated in FIGS. 20-22. As the passageway 176 passes through an inlet 188, a neck 190, and a counter bore 192, as illustrated, the smaller the depth 184 creates the smaller the angle 186 of the constricting plane 178 into the inlet 188 and therefore enables the greater the restriction the curved wall 174 will have on the flow of the undesireables through the variable valve reducer 142 as the curved wall 174 is rotated along the constricting plane 178 and into the passageway 176. Likewise, the greater the depth 184 creates a greater angle 186 of the constricting plane 178 resulting in a larger inlet 188 and therefore, as the curved wall 174 is rotated along the constricting plane 178 and into the passageway 176, the curved wall 174 will have, although an impact, a smaller or less impact on the flow of the undesireables through the variable valve reducer 142.

The curved wall 174, as illustrated in these FIGS. 20-22, is shown in the "fully open" position. In this "fully open" position, the flow of the undesireables is unobstructed by the curved wall 174 as it passes through the passageway 176 of the variable valve reducer 142. In the preferred embodiment, the valve regulator insert 162 is fixedly secured in this "fully open" position using a plunger 194 (see FIG. 28). The plunger 194 has a protruding tip 196 that is retained or locked into position by one of the plurality of detents 170 in the front surface 166 of the valve regulator insert 162. To accommodate this "fully open" position, the protruding tip 196 of the plunger 194 is aligned with and received into the detent 198, as illustrated in FIGS. 23*a* and 23*b*. In this manner, the valve regulator insert 162 becomes secured or locked into position within the variable valve reducer 142.

If the lever 164 is moved in the direction of Arrow A, as illustrated in FIG. 23*a*, the valve regulator insert 162 is rotated counterclockwise within the variable valve reducer 142. As the lever 164 is moved or rotated in this counterclockwise direction, the force exerted upon the lever 164 and the rotation of the valve regulator insert 162 will exceed the retaining force of the protruding tip 196 of the plunger 194 within the detent 198 and thereby allow the rotation of the valve regulator insert 162 to continue rotating within the variable valve reducer 142. This rotation continues until detent 200 in the front surface 166 of the valve regulator insert 162 (see FIG. 24*b*) becomes aligned with the protruding tip 196 of the plunger 194 to thereby secure or lock the valve regulator insert 162 in a second position. In this second position, as a result of the rotation of the valve regulator insert 162 within the variable valve reducer 142, the curved wall 174 is rotated or moved along the constricting plane 178 to extend into the passageway 176 and thereby begin to obstruct the flow, as illustrated in FIG. 24*a*. As a result, in this second position, twenty-five percent (25%) of the curved wall 174 is extended into the passageway 176 to obstruct the flow within the passageway 176.

If the lever 164 is moved again in the direction of Arrow A, the valve regulator insert 162 is again rotated counterclockwise within the variable valve reducer 142. As the lever 164 is moved or rotated in this counterclockwise direction, the force exerted upon the lever 164 and the rotation of the valve regulator insert 162 will exceed the retaining force of the protruding tip 196 of the plunger 194 within the detent 200 and thereby allow the rotation of the valve regulator insert 162 to continue rotating within the variable valve reducer 142. This rotation continues until detent 202 in the front surface 166 of the valve regulator insert 162 (see FIG. 25*b*) becomes aligned with the protruding tip 196 of the plunger 194 to thereby secure or lock the valve regulator insert 162 in a third position. In this third position, as a result of the rotation of the valve regulator insert 162 within the variable valve reducer 142, the curved wall 174 is rotated or moved along the constricting plane 178 to further extend into the passageway 176 and further obstruct the flow, as illustrated in FIG. 25*a*. As a result, in this third position, fifty percent (50%) of the curved wall 174 is extended into the passageway 176 to obstruct the flow within the passageway 176.

If the lever 164 is moved again in the direction of Arrow A, the valve regulator insert 162 is continued to be rotated counterclockwise within the variable valve reducer 142. As the lever 164 is moved or rotated in this counterclockwise direction, the force exerted upon the lever 164 and the rotation of the valve regulator insert 162 will exceed the retaining force of the protruding tip 196 of the plunger 194 within the detent 202 and thereby allow the rotation of the valve regulator insert 162 to continue rotating within the variable valve reducer 142. This rotation continues until detent 204 in the front surface 166 of the valve regulator insert 162 (see FIG. 26*b*) becomes aligned with the protruding tip 196 of the plunger 194 to thereby secure or lock the valve regulator insert 162 in a fourth position. In this fourth position, as a result of the rotation of the valve regulator insert 162 within the variable valve reducer 142, the curved wall 174 is rotated or moved along the constricting plane 178 to again further extend into the passageway 176 and obstruct the flow even further, as illustrated in FIG. 26*a*. As a result, in this fourth position, seventy-five percent (75%) of the curved wall 174 is extended into the passageway 176 to obstruct the flow within the passageway 176.

If the lever 164 is moved again in the direction of Arrow A, the valve regulator insert 162 is continued to be rotated counterclockwise within the variable valve reducer 142. As the lever 164 is moved or rotated in this counterclockwise direction, the force exerted upon the lever 164 and the rotation of the valve regulator insert 162 is again able to exceed the retaining force of the protruding tip 196 of the plunger 194 within the detent 204 and thereby allow the rotation of the valve regulator insert 162 to continue rotating within the variable valve reducer 142. This rotation continues until detent 206 in the front surface 166 of the valve regulator insert 162 (see FIG. 27*b*) becomes aligned with the protruding tip 196 of the plunger 194 to thereby secure or lock the valve regulator insert 162 in a fifth position. In this fifth position, as a result of the rotation of the valve regulator insert 162 within the variable valve reducer 142, the curved wall 174 is rotated or moved along the constricting plane 178 to again further extend into the passageway 176 and obstruct the flow even further, as illustrated in FIG. 27*a*. As a result, in this fifth position, one hundred percent (100%) of the curved wall 174 is extended into the passageway 176 to maximize the obstruction of the flow within the passageway 176.

Figure 29A:
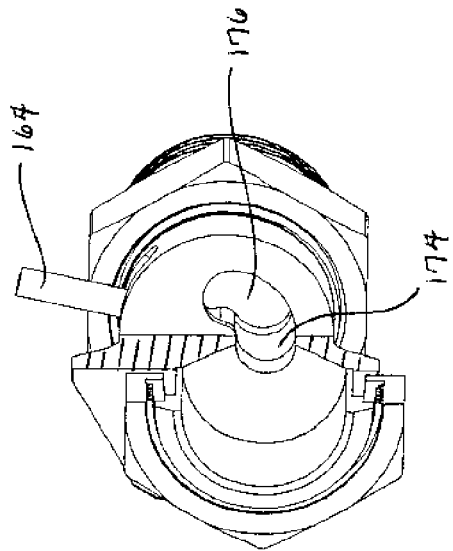
FIG. 29a is a side perspective view, with portions removed, of the variable valve reducer and, in particular, illustrating the curved wall of the valve regulator insert in the fully open position.
Figure 29B:
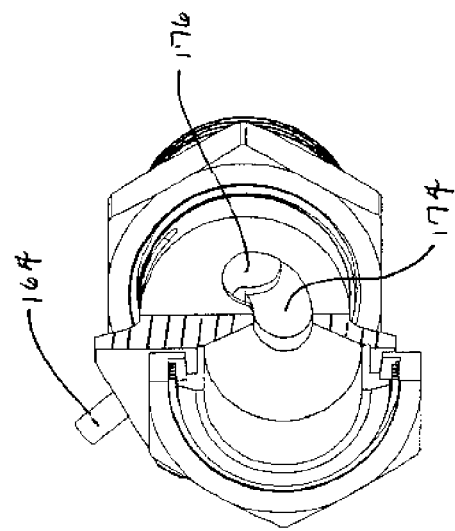
FIG. 29b is a side perspective view, with portions removed, of the variable valve reducer and, in particular, illustrating the curved wall of the valve regulator insert as it rotates towards another position within the passageway.
Figure 29C:
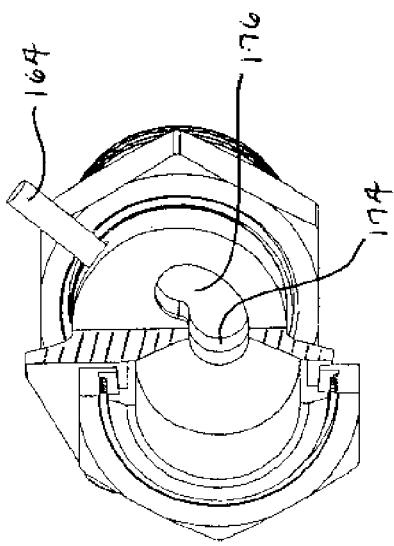
FIG. 29c is a side perspective view, with portions removed, of the variable valve reducer and, in particular, illustrating the curved wall of the valve regulator insert as it continues to rotates toward another position and further into the passageway.
Figure 29D:
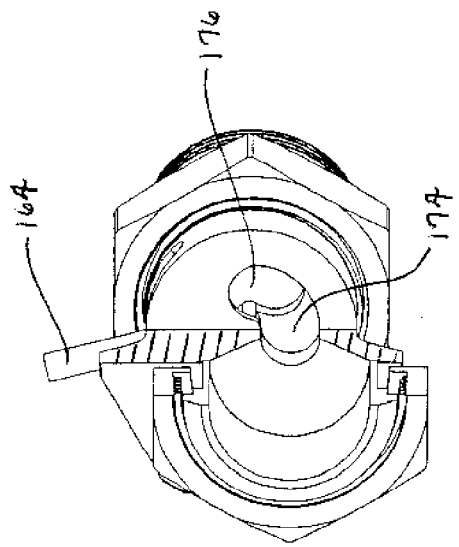
FIG. 29d is a side perspective view, with portions removed, of the variable valve reducer and, in particular, illustrating the curved wall of the valve regulator insert in the fifth position.

As a further example, FIGS. 29*a*-29*d* illustrate the a side perspective view of the variable valve reducer 142 and, in particular, the curved wall 174 of the valve regulator insert 162 as it rotates from the fully open position, as illustrated in FIG. 29*a*, to an extended position situated into or within the passageway 176, as illustrated in FIG. 29*b*, to a further extended position situated into or within the passageway 176, and until finally the curved wall 174 of the valve regulator insert 162 is in its maximum extended position situated or within the passageway 176 at its fifth position.

Alternatively, the lever 164 may be moved in the opposite or counter clockwise direction to re-position the curved wall 174 in the same manner, as desired. Also, in the preferred embodiment, as the curved wall 174 has a curved shape, this shape, in each of the fully open, second position, third position, fourth position, and/or fifth position, further assists in funneling or directing the undesireables as it passes the curved wall 174 toward the neck 190 within the passageway 176 while simultaneously controlling the flow as the curved wall 174 rotates along the constricting plane 178.

Upon completion of the system and process described herein, a batch of meat inserted into Applicant's meat grinding system is processed in a single processing run (i.e., through the primary meat grinding unit 32 which generates the initial pure meat from the batch and secondary or reclaiming meat grinding unit 34 which generates the additional or final pure meat from the batch with any remaining undesireables from the batch being discarded through the secondary transfer pipe). This single processing run is of a batch of meat, is continuous and without interruption or storage of any kind, with all of the resulting pure meat from each batch of meat being produced and generated into a single container for further commercial preparation and distribution.

Thus, there has been provided Applicant's inventive continuous meat grinding reclaiming system. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A meat grinding method having a primary meat grinding unit and a secondary meat grinding unit, comprising the steps of:
   depositing meat in the primary meat grinding unit, the meat containing both meat and bone;
   grinding the meat in the primary meat grinding unit;
   separating the meat into initial meat that does not contain bone and meat that does contain bone;
   removing the initial meat that does not contain bone from the primary meat grinding unit,
   collecting the initial meat that does not contain bone removed from the primary meat grinding unit into a separate container;
   transferring the meat that does contain bone from the primary meat grinding unit into the secondary meat grinding unit, the secondary meat grinding unit connected to the primary meat grinding unit;
   grinding the meat that does contain bone in the secondary meat grinding unit;
   separating the meat that does contain bone into additional meat that does not contain bone and meat that still contains bone;
   removing the additional meat that does not contain bone from the secondary meat grinding unit;
   collecting the additional meat that does not contain bone removed from the secondary meat grinding unit into the container, this additional meat mixing with the initial meat from the primary meat grinding unit for forming a single batch of pure meat; and
   discarding the remaining meat that still contains bone.

2. The meat grinding method of claim 1 and further comprising the step of grinding all of the meat through the primary meat grinding unit and the secondary meat grinding unit in a single processing run.

3. The meat grinding method of claim 2 and further comprising the step of providing a single processing run that is continuous.

4. The meat grinding method of claim 3 and further comprising the step of grinding the meat that does contain bone in the secondary meat grinding unit immediately after being transferred from the primary meat grinding unit.

5. The meat grinding method of claim 4 and further comprising the step of transferring the meat that does contain bone through a transfer pipe between the primary meat grinding unit and the secondary meat grinding unit.

6. The meat grinding method of claim 5 and further comprising the step of forcing the initial meat that does not contain bone through a plurality of holes in a recessed plate in the primary meat grinding unit.

7. The meat grinding method of claim 6 and further comprising the step of forcing the meat that does contain bone into a central opening in the recessed plate in the primary meat grinding unit.

8. The meat grinding method of claim 7 and further comprising the step of funneling the meat that does contain bone from the central opening in the recessed plate in the primary meat grinding unit and into the transfer pipe.

9. The meat grinding method of claim 8 and further comprising the step of forcing the additional meat that does not contain bone through a second plurality of holes in a second recessed plate in the secondary meat grinding unit.

10. The meat grinding method of claim 9 and further comprising the step of forcing the remaining meat that does contain bone into a second central opening in the second recessed plate in the secondary meat grinding unit.

11. The meat grinding method of claim 10 and further comprising the step of funneling the remaining meat that does contain bone from the second central opening in the second recessed plate in the secondary meat grinding unit and into a secondary transfer pipe leading to an exit portal.

12. A meat grinding method having a primary meat grinding unit and a secondary meat grinding unit, comprising the steps of:
   depositing a batch of meat into the primary meat grinding unit, the batch of meat containing both meat and bone;
   advancing the batch of meat into a recessed plate;
   cutting the batch of meat into a first plurality of smaller pieces of meat, the first plurality of smaller pieces of meat comprising meat that does not contain bone and meat that does contain bone, the meat that does not contain bone defining a first set of pure meat and the meat that does contain bone defining a first set of meat that does contain bone;
   forcing the first set of pure meat through the recessed plate to remove the first set of pure meat from the primary meat grinding unit;
   collecting the first set of pure meat removed from the primary meat grinding unit into a separate container;
   transferring the first set of meat that does contain bone from the primary meat grinding unit and into a secondary meat grinding unit;
   advancing the first set of meat that does contain bone into a second recessed plate;
   cutting the first set of meat that does contain bone into a second plurality of smaller pieces of meat, the second plurality of smaller pieces of meat comprising meat that does not contain bone and meat that does contain bone, the meat that does not contain bone defining a second set of pure meat and the meat that does contain bone defining a second set of meat that does contain bone;
   forcing the second set of pure meat through the second recessed plate to remove the second set of pure meat from the secondary meat grinding unit;
   collecting the second set of pure meat removed from the secondary meat grinding unit into the separate container, the second set of pure meat from the secondary meat grinding unit mixing in the separate container with the first set of pure meat; and
   discarding the second set of meat that does contain bone.

13. The meat grinding method of claim 12 and further comprising the step of depositing the batch of meat into a hopper in the primary meat grinding unit.

14. The meat grinding method of claim 13 and further comprising the step of cutting the batch of meat into a plurality of smaller batches.

15. The meat grinding method of claim 14 and further comprising the step of advancing each of the plurality of smaller batches of meat from the hopper and into a spiral barrel.

16. The meat grinding method of claim 15 and further comprising the step of advancing each of the plurality of smaller batches of meat through the spiral barrel and into the recessed plate.

17. The meat grinding method of claim 13 and further comprising the step of advancing each of the plurality of smaller batches of meat into the recessed plate.

18. The meat grinding method of claim 17 and further comprising the step of forcing the first set of pure meat through a plurality of holes in the recessed plate and into the separate container.

19. The meat grinding method of claim 18 and further comprising the step of advancing the first set of meat that does contain bone through the central opening and into a transfer pipe.

20. The meat grinding method of claim 19 and further comprising the step of advancing the first set of meat that does contain bone through the transfer pipe and into an inlet tube in the secondary meat grinding unit.

21. The meat grinding method of claim 20 and further comprising the step of advancing the first set of meat that does contain bone through the inlet tube and into a spiral barrel in the secondary meat grinding unit.

22. The meat grinding method of claim 21 and further comprising the step of advancing the first set of meat that does contain bone through the spiral barrel and into the second recessed plate.

23. The meat grinding method of claim 22 and further comprising the step of advancing the second set of meat that does contain bone through the secondary transfer pipe and out an exit portal where the second set of meat that does contain bone is discarded.

* * * * *